United States Patent [19]

Nelson

[11] 3,847,089

[45] Nov. 12, 1974

[54] VEHICLE DRIVE MEANS
[75] Inventor: Roy A. Nelson, Grand Prairie, Tex.
[73] Assignee: LTV Aerospace Corporation, Dallas, Tex.
[22] Filed: Oct. 16, 1972
[21] Appl. No.: 298,064

[52] U.S. Cl. ........................................ 104/148 LM
[51] Int. Cl. ........................ B60l 13/00, B61b 13/08
[58] Field of Search .......................... 104/148 LM

[56] References Cited
UNITED STATES PATENTS

| 3,641,939 | 2/1972 | Remy | 104/148 LM |
|---|---|---|---|
| 573,823 | 12/1896 | Leffler | 104/148 LM |
| 3,616,762 | 11/1971 | Benner | 104/148 LM |
| 3,602,786 | 8/1971 | Izhelya et al. | 104/148 LM |

Primary Examiner—Lloyd L. King
Assistant Examiner—George H. Libman
Attorney, Agent, or Firm—Walter J. Jagmin

[57] ABSTRACT

A drive means for a vehicle travelling over a roadway having the primary of a linear induction motor embedded in the roadway, the secondary of the motor being mounted on the vehicle for operative association with the primary by means providing for vertical movement of the secondary relative to the roadway for providing a propelling thrust force to the vehicle which varies in accordance with the load carried by the vehicle to cause the acceleration and speed of movement of the vehicle over the roadway to be substantially the same for all vehicles regardless of variations in the load being transported thereby.

5 Claims, 6 Drawing Figures

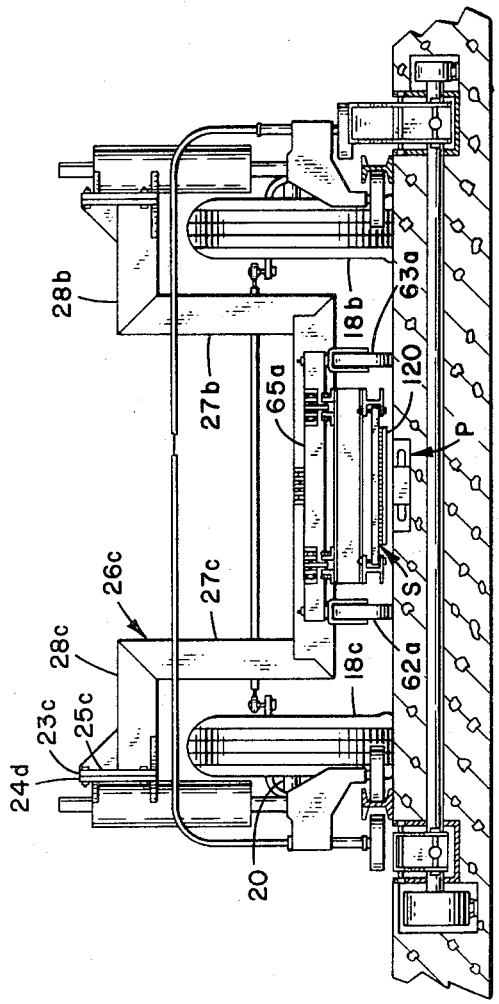
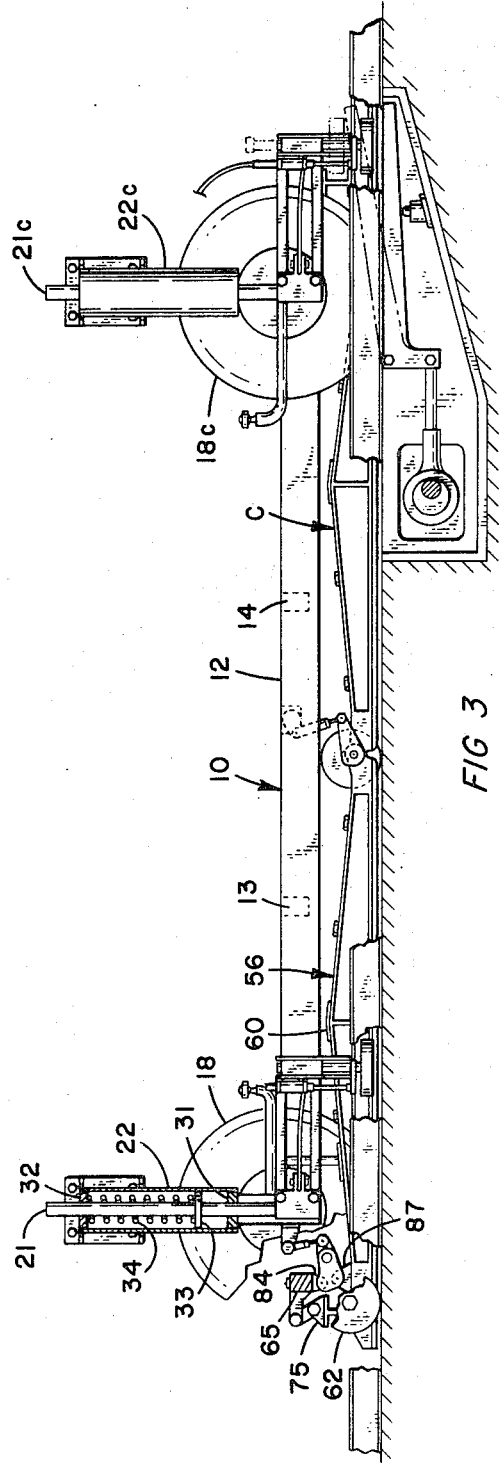

VEHICLE DRIVE MEANS

This invention relates to vehicle and more particularly to a drive means for vehicles.

In transportation systems employing linear induction motors for propelling vehicles over a roadway in which the primary of the motor is embedded in the roadway, the vehicles having connected thereto secondaries of the motor, it is desirable that the acceleration and speed of movement of vehicles carrying different loads be substantially equal in order to maintain a desired spacing or headway between adjacent vehicles and to prevent collisions therebetween.

Accordingly, it is an object of this invention to provide a new and improved drive means for electrically powered vehicles.

Another object is to provide a new and improved drive means for vehicles travelling over a roadway and over the primary of a linear induction motor embedded in the roadway, the drive means comprising the secondaries of the motor connected to the chassis of the vehicles by means which vary the distance or air gap between the secondaries and the primary in accordance with the load carried by the vehicles in order to vary the propelling thrust forces on the vehicles in accordance with the loads being carried thereby to maintain the accelerations and speeds of movement of unequally loaded vehicles substantially equal.

Still another object is to provide a drive means, of the type described, wherein the means connecting the motor secondary to the vehicle permits accomodation of the secondary to variations in the roadway surface.

An important object of the invention is to provide a vehicle having a chassis supported on wheels by connecting means which permit vertical movement of the chassis relative to the wheels, and therefore to the roadway, in accordance with the load carried by the vehicle, and a secondary supported by rollers for movement on the roadway and connected to the chassis by means which cause predetermined vertical movement of the secondary in accordance with the vertical movement of the chassis to vary the air gap between the primary and the secondary.

Another object is to provide a vehicle, of the type described, wherein the secondary has at least two sections whose adjacent ends are connected for pivotal movement about a transverse horizontal axis and supported at the location of connection of the two sections by rollers, the adjacent ends of the two sections also being movable vertically by the connecting means.

Other objects and advantages will be apparent from the specification and claims and from the accompanying drawing illustrative of the invention.

In the drawing:

FIG. 2 is a sectional view taken on line 2—2 of FIG. 1;

Figure 1:
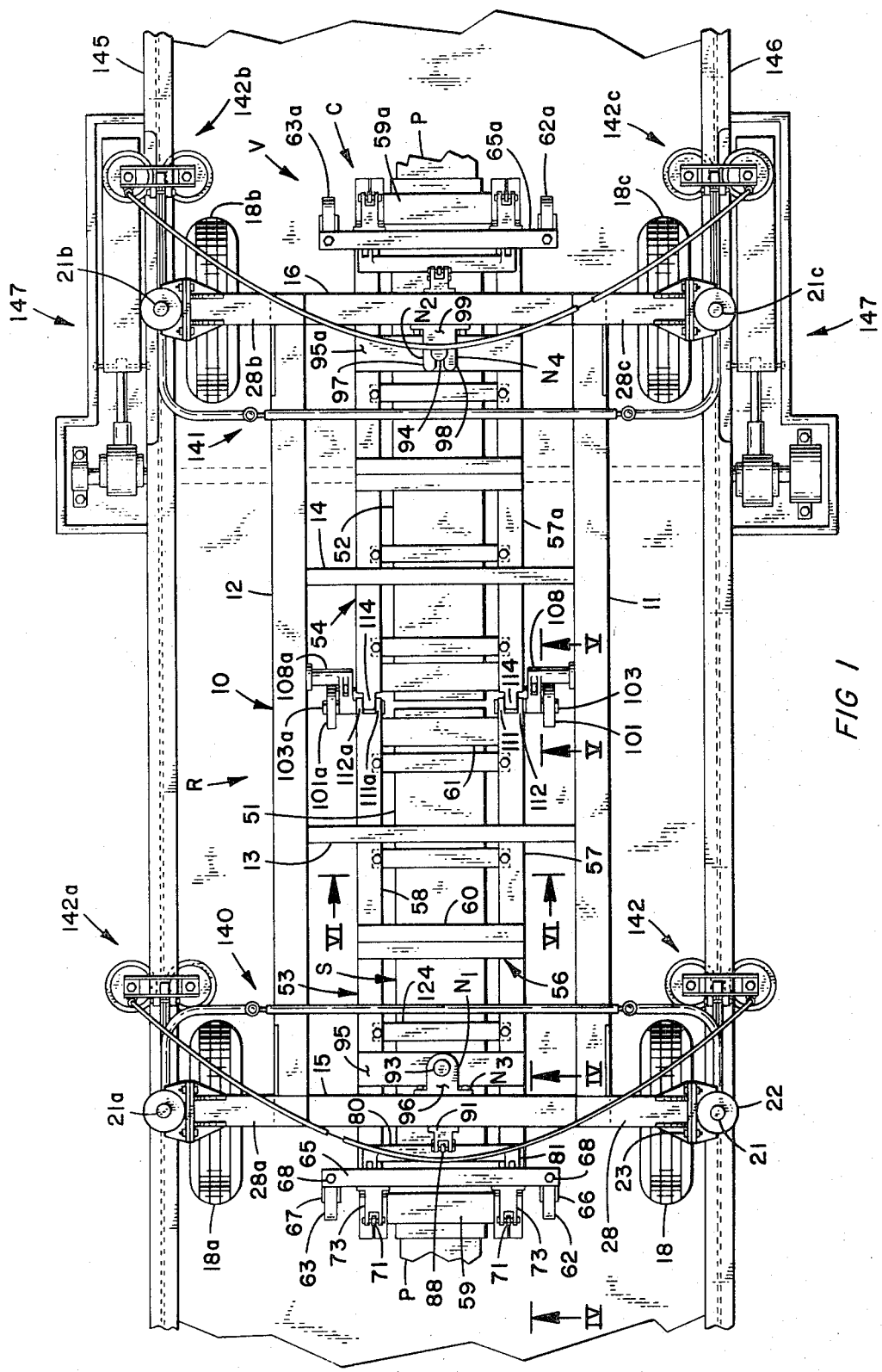
FIG. 1 is a top view of the chassis of a vehicle proivded with the drive means embodying the invention shown positioned on a roadway having primaries of an electric motor embedded therein.
Figure 4:
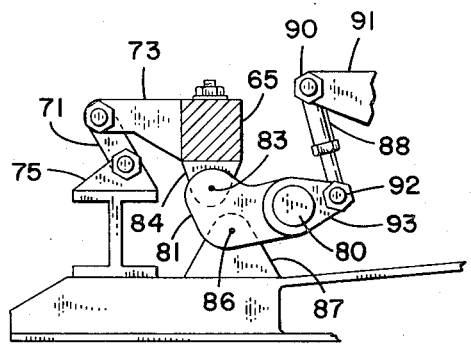
Figure 5:
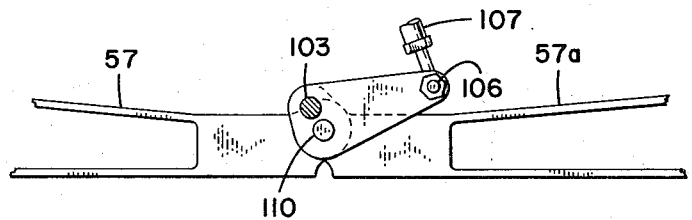
Figure 6:
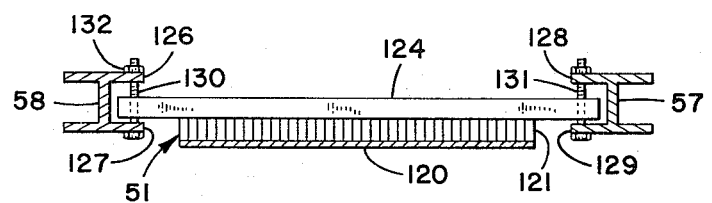

FIG. 3 is a side view of the vehicle and roadway of FIG. 1 with some parts broken away and some shown in section; and FIGS. 4, 5 and 6 are enlarged sectional views taken on lines 4—4, 5—5 and 6—6, respectively, of FIG. 1.

Referring now to the drawings, the vehicle V has a chassis 10 on which a suitable cargo or passenger carrying body may be mounted, such body not being shown for clarity of illustration of the invention.

The chassis includes a pair of longitudinal members 11 and 12 connected by intermediate transverse members 13 and 14 and by rear and front transverse members 15 and 16, respectively. The chassis is supported on the roadway by four wheels 18, 18a, 18b and 18c.

The wheel 18 is rotatably supported on the horizontal axle portion 20 of a king pin 21 which extends slidably and rotatably through a king pin housing 22 which is secured to the right rear end of the chassis by means of bolts 23 which connect the housing bracket 24 to a bracket 25 of an arm 26 of the chassis the arm having a vertical portion 27 connected to the right rear end of the chassis and a horizontal portion 28 which extends outwardly over the right rear wheel 18.

The king pin extends through suitable bottom and top bearings 31 and 32, respectively, of the housing and has an intermediate external annular flange 33. A spring 34 which extends about the king pin has a bottom portion which bears against the flange 33 and a top portion which bears against the top bearing 32 so that the right rear corner of the chassis is yieldably supported on the king pin and will, of course, move vertically relative to the king pin in accordance with the load supported on the chassis.

The other wheels 18a, 18b and 18c and the means by which the other corners of the chassis are supported thereon being identical to the means by which the right rear corner of the chassis is supported on the wheel 18, the elements of such means of the wheels 18a, 18b and 18c have been provided with the same reference numerals, to which the subscripts a, b and c, respectively, have been added, as the elements of the means by which the right rear corner of the chassis is supported on the wheel 18.

It will be apparent that due to the provision of the springs which yieldably upwardly bias the four corners of the chassis, the vertical position of the chassis relative to the roadway R will vary with the load carried by the chassis as the springs compress as the load is increased. While the pneumatic tires of the wheels will also deform as the load is increased, any downward movement of the chassis due to such deformation of the tires is relatively small compared to the downward movement of the chassis on the king pins.

The roadway has embedded therein at predetermined distances a plurality of primaries P, which may include three phase windings, of a linear induction motor over which a secondary S of the motor, mounted on the carriage C, is movable. The secondary S may be formed of two sections 51 and 52 rigidly connected to the rear and front sections 53 and 54 of the carriage C.

The rear section 53 of the carriage includes a frame 56 which includes side members 57 and 58 which are connected at the rear or outer end of the frame by a transverse beam 59, at its middle by a plate 60 and at its inner end by a transverse strap 61.

The frame 56 is supported at its outer or rear end by a pair of rollers 62 and 63 which are mounted on opposite ends of a bar 65 by means of casters or brackets 66 and 67, respectively, with the brackets being pivotal about the vertical axes of the studs 68 by which they are secured to the opposite ends of the bar. The outer transverse beam 59 of the frame 56 is connected to the bar by a pair of links 71 whose lower ends are secured pivotally to similar pairs of brackets 75 secured to the top surface of the carriage frame beam 59.

The bar 65 is secured to the front transverse member 15 of the chasis by a torsion bar 80 having end brackets 81 pivotally secured, as at 83 to downwardly extending lugs 84 of the transverse bar 65. The brackets 81 are also secured pivotally, as at 86, to upstanding lugs 87 on the longitudinal members 57 and 58, respectively, of the carriage frame.

A link 88 has its upper end pivotally secured as at 90, to a bracket 91 secured to the chassis frame member 15 and its lower end pivotally secured, as at 92, to a lug 93 rigid with the torsion bar and extending forwardly therefrom.

It will be apparent that as the outer rear end of the chassis moves downwardly relative to the wheel 18 and 18a, the torsion bar 80 will pivot in a clockwise manner (FIG. 3 and 4) about the axis 83 relative to the bar 65 and also clockwise about the axis 86 relative to the lugs 87 rigid with the outer end of the carriage frame so that the rear end of the frame 56 will move downwardly relative to the rollers 62 and 63 and the roadway R. Conversely, upward movement of the rear end of the chassis relative to its support wheels 18, will cause upward movement of the rear end of the frame 56 as the torsion bar pivots counterclockwise about the axes 83 and 86. During pivotal movement of the torsion bar relative to the roller bar 65 and the carriage frame 56, the links 71 pivot to stabilize the roller bar 65 so that the caster studs 68 remain essentially perpendicular to the roadway. The rear wheels 62 and 63 will move forwardly relative to the chassis as the carriage frame moves downwardly relative to the roadway and rearwardly as the carriage frame moves upwardly since the longitudinal position of the carriage relative to the chassis will not change during vertical movement of the carriage relative to the roadway.

The front section 54 of the carriage is of the same construction as the rear section 53 and is secured to the chassis front transverse member 16 in the same manner as the rear section is secured to the chassis rear transverse member 15, and, accordingly, the elements of the front carriage section 52 and of the means by which it is secured to the chassis front transverse member 16 have been provided with the same reference numerals, to which the subscript *a* has been added, as the corresponding elements of the rear section of the carriage and of the means by which it is secured to the chassis rear transverse member 15.

Horizontal movement of the carriage C relative to the chassis 10 is prevented by a pair of vertical pins 93 and 94 rigidly secured to and extending vertically upwardly from the transverse members 95 and 95a secured to the carriage frame members 57 and 58 and 57a and 58a, respectively. The rear pin 91 extends slidably through the bore of a bracket 96 secured to the chassis rear transverse member 15 and the pin 94 extends through the slot provided by the legs 97 and 98 of a bracket 89 secured to the chassis front transverse member 16. The forward pin 94 may move longitudinally to allow for variations in the distances between the pins 93 and 94 due to pivotal movement of the front and rear carriage sections 53 and 54 about the shafts 110 and 110a, as will be explained below, which connect the adjacent ends of the carriage sections caused by movement of the carriage over uneven portions of the roadway.

The front and rear ends of the carriage rear and front sections 52 and 53 are supported by a pair of rollers 101 and 101a which are rotatably mounted on shafts 103 and 103a. The shafts have forwardly extending arms 105 and 105a, respectively, whose front upper ends are pivotally connected as at 106 and 106a, respectively, to the lower ends of the links 107 and 107a respectively, the upper ends of the links 107 and 107a being pivotally connected to the brackets 108 and 108a, respectively, rigid with the chassis front members 11 and 12, respectively.

The arms 105 and 105a have inner shafts 110 and 110a which extend inwardly to pivotally connect the adjacent inner ends of the carriage sections 53 and 54. The shaft 110 extends through aligned apertures in the spaced legs 111 and 112 of the carriage frame member 57 and the reduced end portion 114 of the carriage frame member 57a. Similarly, the shaft 110a extends through the legs 111a and 112a of the frame member 58 and the reduced end portion 114a of the frame member 58a.

It will be apparent that if the chassis moves downwardly relative to the roadway at the location of the brackets 108 and 108a, the shafts 110 and 110a will be pivoted in a clockwise manner about the axis of the shafts 103 and 103a and this will cause the adjacent connected end of the carriage sections to move downwardly relative to the roadway. Conversely, upward movement of the chassis will cause upward movement of the adjacent connected ends of the carriage sections. The rollers 101 and 101a will of course move forwardly during the downward movement of the chassis and rearwardly during the upward movement of the chassis since the longitudinal position of the carriage relative to the chassis will remain unchanged.

The rear section 51 of the secondary S includes a bottom sheet or plate 120, of a good electrically conductive substance such as copper, which is rigidly secured to the bottom surface of a body 121 formed of laminations of a magnetic substance, such as steel. The section 51 of the secondary S is secured to the carriage side frame members 57 and 58 by a plurality of transverse bars 124 which are rigidly secured in any suitable manner, as by welding or the like, to the top surface of the body 121. The extreme left hand portions of the bars 124 extend between the top and bottom inner flanges 126 and 127 of the frame member 57 and the extreme right hand portions of the bars extend between the internal flanges 128 and 129 of the frame members 57. Bolts 130 extend through suitable aligned apertures in the flanges 126 and 127 and through threaded bores in the support bars 124. Similarly, bolts 131 extend through suitable apertures in the flanges 128 and 129 of the carriage frame member 57 and through threaded bores in the bars 124.

It will be apparent that as the bolts are rotated in one direction or the other, the bars 124 will move upwardly or downwardly. When the secondary is in a desired vertically adjusted position, the bolts of course are locked against rotation by suitable lock nuts 132 which are threaded thereon.

The front and rear pairs of wheels are connected by tie rod assemblies 140 and 141. Guide and steering wheel assembly 142, 142a, 142b and 142c connected to the king pins of the wheels 18, 18a, 18b and 18c, respectively, cooperate with guide and steering tracks 145 and 146 of the roadway to maintain the vehicle V in a predetermined path of movement. Switching assemblies 147 adjacent the tracks may be employed to shunt the vehicles into different paths of movement. Since the particular steering and switching means of and for the vehicle do not constitute a part of the invention claimed in this application, they will not be described in greater detail herein but are fully described in the application of Roy A. Nelson being filed concurrently herewith and assigned to the assignee of this application.

It will be seen that as the load on the vehicle carried by the chassis is increased, as for example, when a number of passengers enter the body mounted on the chassis, the chassis will move downwardly relative to the roadway and the wheels since the springs 34 in the king pin housings will of course compress to permit such downward movement. As a result, the opposite ends of the carriage sections will be moved downwardly relative to the roadway and the sections 51 and 52 of the secondary S mounted on the carriage will of course also move downwardly thus decreasing the air gap between the primaries of the linear induction motor embedded in the roadway. Since the windings of the primaries, not shown, are energized by three phase alternating current, the magnetic force produced by the eddy currents induced in the plates 120 and 120a of the two secondary sections will exert a propelling or thrust force on the secondaries, and therefore the carriage C and the chassis 10, in the direction of movement of the electromagnetic fields produced by the three phase current flowing in the windings of the primaries. The magnetic forces thus produced also tend to pull the secondary downwardly toward the primaries and for this reason the carriage is mounted on rollers which do not deform, as would wheels provided with pneumatic tires, due to such downward force.

The longitudinal thrust forces on the linear motor secondary, as will be understood by those skilled in the art, vary with the vertical air gap between the secondary and the primaries which it overlies. The vertical movement of the secondaries of the vehicles vary in such relation with variations of the load carried by the vehicles as to cause the vehicles, during normal movement thereof over the roadway, to move at equal accelerations and speeds even though some may carry appreciably heavier loads than others.

It will be apparent that if the propelling thrust forces on all vehicles were equal, even though some carried heavier loads than others, the vehicles carrying lighter loads would tend to move at higher accelerations and speeds than those carrying heavier loads due to the greater inertia and greater frictional forces respectively resisting movement of the heavier loaded vehicles. As a result, the desired distances or headways between adjacent vehicles would not be maintained and collisions between vehicles would occur.

The degree of vertical movement of the secondaries with predetermined variations of vehicle load is predetermined by the various moment arms of the linkage linking the ends of the carriage frame sections to the adjacent rollers supporting the carriage so as to cause the thrust forces to vary with load in such manner as to cause the vehicles to travel at equal accelerations and speeds regardless of variations in load carried thereby over their normal load ranges.

It will further be noted that the carriage is formed of two sections articulately connected at their adjacent ends so that the two sections may move pivotally relative to one another to accomodate unevenness in the roadway. The rear rollers 62 and 63 and the front rollers 62a and 63a are turnable about vertical axes due to their caster mounting to minimize sliding friction between the wheels and the roadway during movement of the carriage about curved portions of the roadway. The rollers 101 and 101a do not require such caster mounting means as they are located at the central transverse axis of the carriage.

The downward force exerted by the secondary of the linear induction motion of the carriage, due to the magnetic force between the secondary and a primary above which it is moving is not of appreciable magnitude since the moment arms or distances between the axes 83 and 83a and the axes 86 and 86a, respectively, are very much shorter than the distances between the axes 86 and 86a and the axes 92 and 92a. Similarly, the distances between the axes of the shafts 110 and 110a and the shafts 103 and 103a are very much shorter than the distances between axes of the shafts 110 and 110a and the axes 106 and 106a. As a result, the vertical movement of the secondary will be primarily affected by the load on the carriage.

It will now be seen that a new and improved drive or propelling means for a vehicle of a transportation system has been illustrated and described wherein the vehicle has a chassis mounted on wheels for movement over a roadway by mounting means which provide for yieldable vertical movement of the chassis relative to the wheels and roadway in accordance with variations in the load carried by the vehicle, and the vehicle is propelled by a linear induction motor having one of its two operative elements, the primary or the secondary, embedded in the roadway and the other connected to the vehicle chassis.

It will further be seen that the motor element is connected to the chassis by means which automatically adjust the vertical position of the motor element connected to the chassis in accordance with the variation in the load carried by the vehicle to vary the air gap between the two motor elements in accordance with such variations in load so as to cause the propelling or thrust force to vary directly with the load to maintain substantially constant the normal accelerations and cruising speed of travel of the vehicle regardless of the variations in the load carried thereby.

While only one embodiment of the invention, together with modifications thereof, has been described in detail herein and shown in the accompanying drawing, it will be evident that various further modifications are possible in the arrangement and construction of its components without departing from the scope of the invention.

What is claimed is:

1. In a vehicle movable over a roadway having one operative element of a linear induction motor extending longitudinally along the roadway;
   a chassis;
   a plurality of wheels movable over the roadway;
   mounting means connecting the chassis to the wheels
      including means yieldably biasing the chassis against downward movement relative to the wheels;

a second element of the linear induction motor for imparting a thrust force to said chassis to move the vehicle over the roadway when said motor is energized;

connecting means connecting said second motor element to said chassis including means for varying the operative position of said second element relative to said first element for varying the propelling thrust force on the chassis in accordance with the load on the chassis, said connecting means including a carriage, front and rear pairs of rollers supporting front and rear ends of said carriage for movement over the roadway, and linkage means operatively associated with said chassis and said rollers for moving said carriage vertically relative to said rollers in accordance with the vertical movement of said chassis relative to said wheels, said second element being rigidly secured to said carriage.

2. The device of claim 1, wherein said carriage includes a pair of sections and said second element includes a pair of sections rigidly connected to said carriage sections, and means connecting adjacent ends of said carriage sections for pivotal movement about a horizontal axis transverse relative to said roadway.

3. The apparatus of claim 2 wherein said front rollers supporting the front end of said carriage and said rear rollers supporting the rear end of said carriage are rotatable about horizontal axes and turnable about vertical axes, and intermediate rollers supporting said adjacent ends, said linkage means including means interconnecting said rollers and said carriage providing connections between said rollers and said carriage which are pivotally movable about horizontal axes spaced from the axes of rotation of said rollers for causing said connections to move pivotally downwardly about said axies of rotation as said chassis moves downwardly relative to said wheels.

4. The apparatus of claim 1, wherein said linkage means for each pair of front and rear rollers includes a transverse roller bar, said rollers of each pair being connected to opposite ends of said roller bar and being rotatable about first horizontal axes and turnable about vertical axes, means connecting said roller bar to the adjacent end of said carriage permitting pivotal movement of said roller bar and the adjacent end of said carriage about second and third spaced horizontal axis, and means connecting said roller bar to the adjacent end of said chassis for permitting movement of said roller bar and said adjacent end of said carriage about said second and third axes for moving said adjacent end of said carriage downwardly relative to said pair of rollers when said adjacent end of said chassis is moved downwardly.

5. The apparatus of claim 2, wherein said linkage means for each pair of front and rear rollers includes a transverse roller bar, said rollers of the pair being connected to opposite ends of said roller bar and being rotatable about a first horizontal axes and turnable about vertical axes, means connecting said roller bar to the adjacent end of said carriage permitting pivotal movement of said roller bar and the adjacent end of said carriage about second and third spaced horizontal axis, and means connecting said roller bar to the adjacent end of said chassis for permitting movement of said roller bar and said adjacent end of said carriage about said second and third axes for moving said adjacent end of said carriage downwardly relative to said pair of rollers when said adjacent end of said chassis is moved downwardly; and wherein said means connecting said intermediate rollers to said chassis includes second linkage means including first means connecting said intermediate rollers to said adjacent connected ends of said carriage at spaced locations of the connection of said adjacent ends and of the axis of rotation of said intermediate rollers, and second means pivotally connecting said first means to said chassis for causing said adjacent ends of said carriage to move vertically relative to the axis of rotation of said intermediate rollers in accordance with the vertical movement of said chassis at a location intermediate its ends.

* * * * *